(12) United States Patent
Liu

(10) Patent No.: US 11,575,776 B2
(45) Date of Patent: Feb. 7, 2023

(54) INFORMATION TRANSMISSION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 45 days.

(21) Appl. No.: 17/195,620

(22) Filed: Mar. 8, 2021

(65) Prior Publication Data
US 2021/0203762 A1    Jul. 1, 2021

Related U.S. Application Data

(63) Continuation of application No. PCT/CN2018/109089, filed on Sep. 30, 2018.

(51) Int. Cl.
| | | |
|---|---|---|
| *H04L 69/22* | (2022.01) | |
| *H04W 28/02* | (2009.01) | |
| *H04L 12/46* | (2006.01) | |
| *H04M 15/00* | (2006.01) | |
| *H04W 76/12* | (2018.01) | |

(52) U.S. Cl.
CPC .......... *H04L 69/22* (2013.01); *H04L 12/4679* (2013.01); *H04M 15/66* (2013.01); *H04W 28/0268* (2013.01); *H04W 76/12* (2018.02)

(58) Field of Classification Search
CPC .... H04L 69/22; H04L 12/4679; H04W 76/12; H04W 28/0268; H04M 15/66

USPC ......................................... 370/310, 328, 329
See application file for complete search history.

(56) References Cited

U.S. PATENT DOCUMENTS

| 9,178,717 | B1 * | 11/2015 | Ruble | ................. H04L 12/6418 |
| 2009/0141703 | A1 | 6/2009 | Ghodrat et al. | |
| 2014/0036775 | A1 * | 2/2014 | Asterjadhi | ............ H04L 1/1896 |
| | | | | 370/328 |
| 2016/0309397 | A1 * | 10/2016 | Zhou | ..................... H04W 48/10 |

(Continued)

FOREIGN PATENT DOCUMENTS

| CN | 101141385 A | 3/2008 |
| CN | 101369977 A | 2/2009 |

(Continued)

OTHER PUBLICATIONS

First Office Action for Chinese Application No. 201880094351.X dated Nov. 19, 2021. 12 pages with English translation.

(Continued)

*Primary Examiner* — Obaidul Huq
(74) *Attorney, Agent, or Firm* — Perkins Coie LLP

(57) ABSTRACT

Provided are an information transmission method and apparatus, and a communication device. The method comprises: a first device entity acquiring header information of an Ethernet data packet from a second device entity, wherein the header information of the Ethernet data packet comprises first indication information, and the first indication information is used for indicating whether the header information of the Ethernet data packet includes a target information domain.

11 Claims, 3 Drawing Sheets

A first device entity acquires header information of an Ethernet data packet form a second device entity, wherein, the header information of the Ethernet data packet comprises first indication information, and the first indication information is used for indicating whether the header information of the Ethernet data packet contains a target information field

301

(56) References Cited

U.S. PATENT DOCUMENTS

2017/0318518 A1    11/2017  Kim et al.
2019/0116521 A1*   4/2019   Qiao ..................... H04L 69/04

FOREIGN PATENT DOCUMENTS

CN    105490945 A    4/2016
CN    106506457 A    3/2017

OTHER PUBLICATIONS

International Search Report dated Jun. 27, 2019 of PCT/CN2018/109089 (4 pages).

* cited by examiner

A first device entity acquires header information of an Ethernet data packet form a second device entity, wherein, the header information of the Ethernet data packet comprises first indication information, and the first indication information is used for indicating whether the header information of the Ethernet data packet contains a target information field    301

FIG. 3

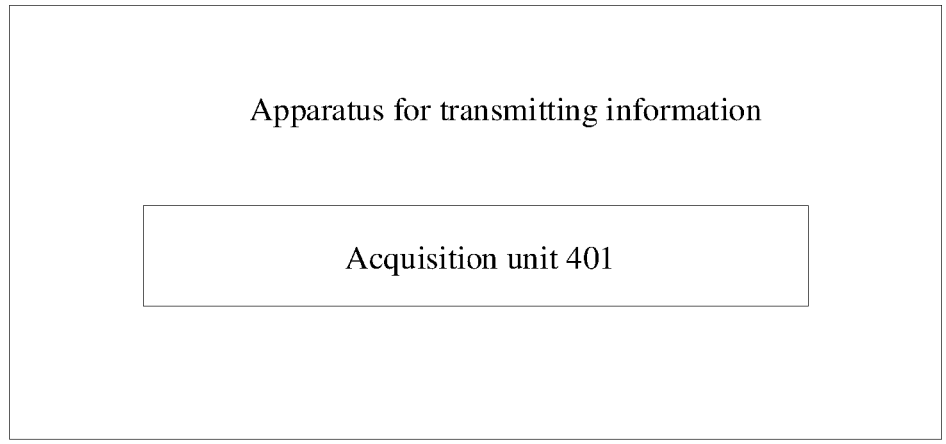

FIG. 4

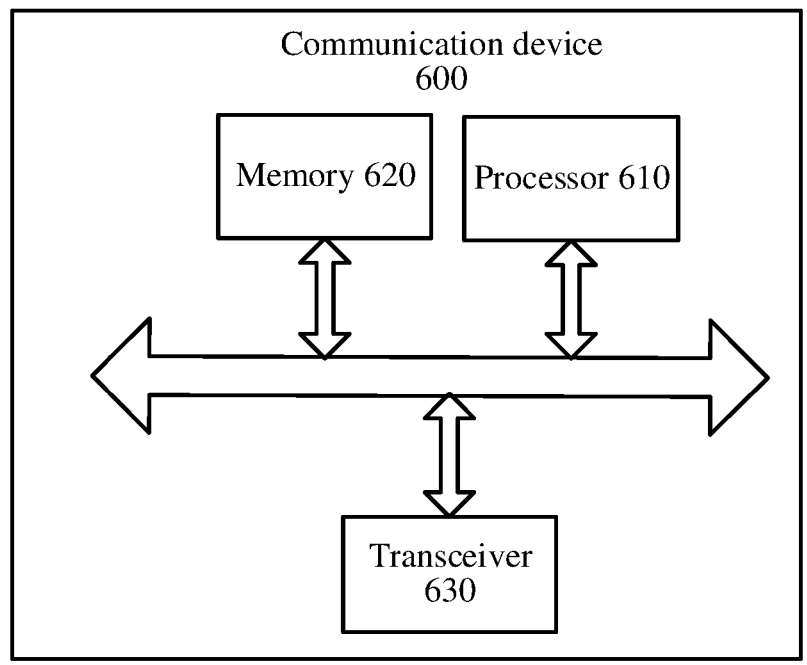

FIG. 5

INFORMATION TRANSMISSION METHOD AND APPARATUS, AND COMMUNICATION DEVICE

CROSS-REFERENCE TO RELATED APPLICATIONS

The present disclosure is a continuation application of International PCT Application No. PCT/CN2018/109089, having an international filing date of Sep. 30, 2018, the contents of the above-identified application is hereby incorporated by reference.

TECHNICAL FIELD

Implementations of the present application relate to the technical field of mobile communication, in particular to a method and an apparatus for transmitting information and a communication device.

BACKGROUND

Under a scenario that a public network system and a local network coexist, when a Protocol Data Unit (PDU) session is Ethernet frames, an Ethernet PDU may or may not carry a Virtual Local Area Network (VLAN) sub-header, and the corresponding Ethernet frame structures are different. In a process of header compression, the header compression algorithms used for these two types of PDUs are different. However, in the prior art, there is no discrimination processing for this scenario.

SUMMARY

Implementations of the present application provide a method and an apparatus for transmitting information and a communication device.

A method for transmitting information provided by an implementation of the present application includes: acquiring, by a first device entity, header information of an Ethernet data packet from a second device entity, wherein the header information of the Ethernet data packet includes first indication information, and the first indication information is used for indicating whether the header information of the Ethernet data packet contains a target information field.

An apparatus for transmitting information provided by an implementation of the present application, which is applied to a first device entity, includes an acquisition unit.

The acquisition unit, configured to acquire header information of an Ethernet data packet from a second device entity, wherein the header information of the Ethernet data packet includes first indication information, and the first indication information is used for indicating whether the header information of the Ethernet data packet contains a target information field.

A communication device provided by an implementation of the present application includes a processor and a memory. The memory is configured to store a computer program, and the processor is configured to call and run the computer program stored in the memory to execute the method for transmitting information described above.

A chip provided by an implementation of the present application is configured to implement the method for transmitting information described above.

Specifically, the chip includes a processor configured to call and run a computer program from a memory to cause a device provided with the chip to execute the method for transmitting information described above.

An implementation of the present application provides a computer readable storage medium configured to store a computer program, and the computer program enables a computer to execute the method for transmitting information described above.

An implementation of the present application provides a computer program product including computer program instructions, and the computer program instructions enable a computer to execute the method for transmitting information described above.

An implementation of the present application provides a computer program that, when run on a computer, enables the computer to execute the method for transmitting information described above.

With the technical solutions, an access network element or a User Plane Function (UPF) entity may correctly acquire header information in an Ethernet data packet, and whether the Ethernet data packet includes 802.1Q label information and/or VLAN identification information may be correctly determined by first indication information in the header information, so that the Ethernet data packet may be correctly processed according to the header information in the Ethernet data packet.

BRIEF DESCRIPTION OF DRAWINGS

The drawings described herein are used to provide a further understanding of the present application and form a part of the present application. Illustrative examples of the present application and the description thereof are used to explain the present application and do not constitute improper limitation of the present application. In the drawings:

FIG. 3 is a schematic flowchart of a method for transmitting information provided by an implementation of the present application;

FIG. 4 is a schematic diagram of composition structure of an apparatus for transmitting information provided by an implementation of the present application;

FIG. 5 is a schematic diagram of a structure of a communication device provided by an implementation of the present application.

DETAILED DESCRIPTION

The technical solution in implementations of the present application will be described below with reference to the drawings in implementations of the present application. It is apparent that the implementations described are just some implementations of the present application, but not all implementations of the present application. According to the implementations of the present application, all other implementations achieved by a person of ordinary skill in the art without paying an inventive effort are within the protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
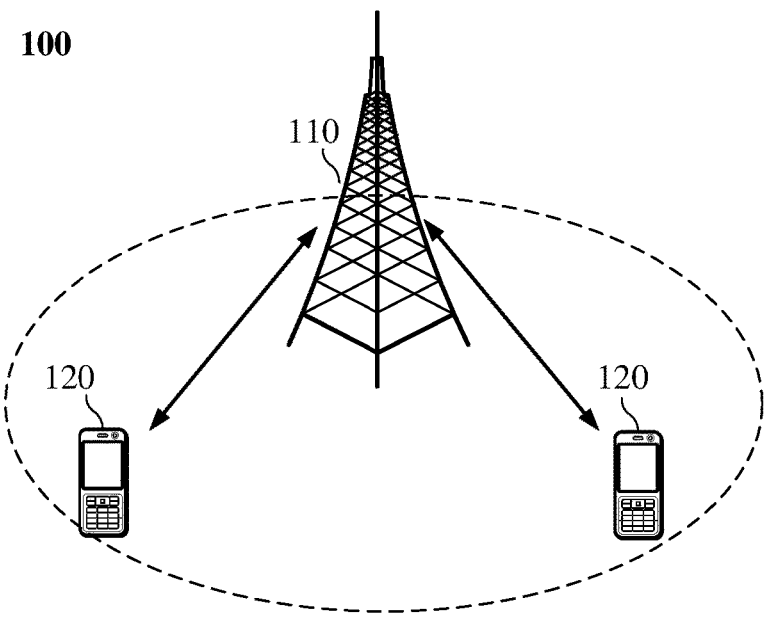
FIG. 1 is a schematic diagram of an architecture of a communication system provided by an implementation of the present application.

Illustratively, a communication system 100 applied in an implementation of the present application is shown in FIG. 1. The communication system 100 may include a network device 110, and the network device 110 may be a device that communicates with a terminal 120 (or referred to as a communication terminal, or a terminal device). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 further includes at least one terminal 120 located within the coverage area of the network device 110. As used herein, the term "terminal" includes, but not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal; and/or an Internet of Things (IoT) device. A terminal configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal that can be combined with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal may be referred to an access terminal, User Equipment (UE), a subscriber unit, a subscriber station, a mobile station, a rover platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a 5G network, a terminal device in a future evolved Public Land Mobile Network (PLMN), or the like.

Optionally, Device to Device (D2D) communication may be performed between the terminals 120.

Optionally, the 5G system or 5G network may be referred to as a New Radio (NR) system or a NR network.

FIG. 1 exemplifies one network device and two terminals. Optionally, the communication system 100 may include multiple network devices, and another quantity of terminals may be included within a coverage area of each network device, which is not limited in the implementations of the present application.

Optionally, the communication system 100 may include other network entities such as a network controller, and a mobile management entity, which is not limited in the implementations of the present application.

It should be understood that, a device with a communication function in a network/system in the implementation of the present application may be referred to as a communication device. Taking the communication system 100 shown in FIG. 1 as an example, communication devices may include a network device 110 and a terminal 120 which have communication functions, and the network device 110 and the terminal 120 may be the specific devices described above, which will not be described here again. The communication devices may also include other devices in the communication system 100, such as a network controller, a mobile management entity, and other network entity, which is not limited in the implementations of the present application.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "I" in this document generally indicates that objects before and after the symbol "I" have an "or" relationship.

In order to facilitate understanding of the technical solutions of implementations of the present application, related technologies related to implementations of the present application will be described below.

Figure 2:
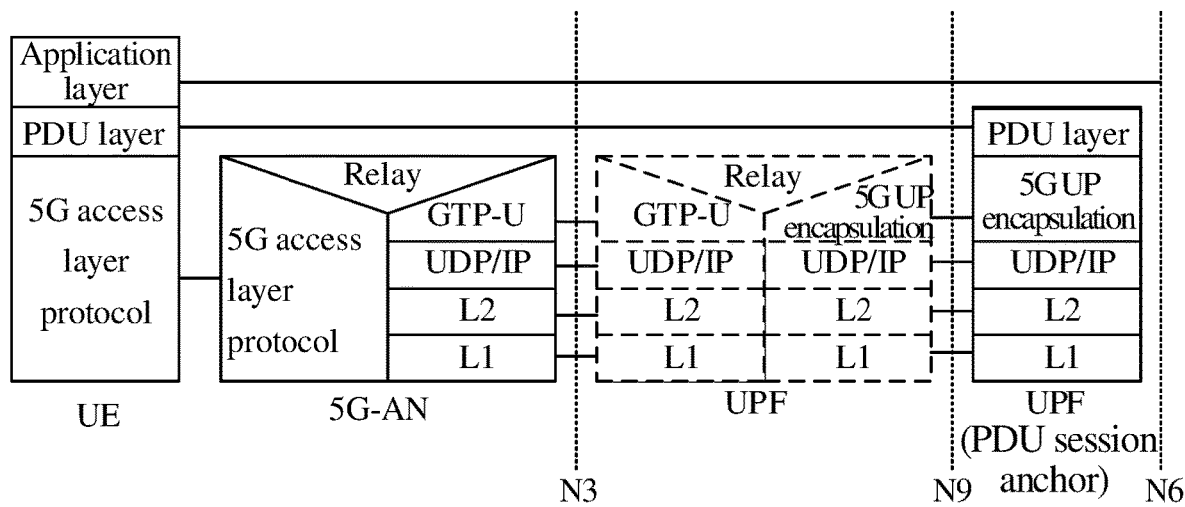
FIG. 2 is a schematic diagram of a 5G protocol stack provided by an implementation of the present application.

In a Long Term Evolution (LTE) system, the type of PDU session is an IP type, but in a 5th Generation (5G) New Radio (NR) system, a PDU session supports not only an IP type but also an Ethernet type. As shown in FIG. 2, for a PDU layer, when the type of a PDU session is IPv4 or IPv6 or IPv4v6, the PDU session corresponds to IPv4 packets and/or IPv6 packets; when the type of the PDU Session is an Ethernet type, the PDU session corresponds to Ethernet frames.

In the LTE and NR systems, a public network system, that is, a network based on Public Land Mobile Network (PLMN), is usually deployed. However, in some scenarios, such as in an office scenario, in a home scenario and in a factory, in order to manage more effectively and safely, a local user or manager usually deploys a local network. Only a user who is authorized to access has the right to access the local network.

On the other hand, header compression and decompression functions are introduced in a Packet Data Convergence Protocol (PDCP), and a PDCP layer supports using different header compressions and header compression parameters for different Data Radio Bearers (DRB) according to configured profiles. The PDCP adopts a Robust Header Compression (ROHC) protocol, and supported profiles are shown in table 1 below:

TABLE 1

| Profile Identifier | Usage | Reference |
| --- | --- | --- |
| 0x0000 | No compression | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

Under the scenario that the public network system and the local network coexist, when the PDU session is Ethernet frames, an Ethernet PDU may or may not carry a VLAN sub-header, and the corresponding Ethernet frame structures are different. In the process of header compression, the header compression algorithms used for these two types of PDUs are different.

FIG. 3 is a schematic flowchart of a method for transmitting information provided by an implementation of the present application. As shown in FIG. 3, the method for transmitting information includes act 301.

In act 301: a first device entity acquires header information of an Ethernet data packet from a second device entity, wherein the header information of the Ethernet data packet includes first indication information, and the first indication information is used for indicating whether the header information of the Ethernet data packet contains a target information field.

Here, the header information of the Ethernet data packet may or may not include 802.1Q label information, and similarly, the header information of the Ethernet data packet may or may not include VLAN identification information. Based on these, the first indication information is used for indicating whether the header information of the Ethernet data packet contains 802.1Q label information and/or VLAN identification information.

In an implementation of the present application, the first device entity acquires the header information of the Ethernet data packet from the second device entity, which can be implemented by the following manners:

Manner One: the first device entity acquires the header information of the Ethernet data packet from the second device entity through a control plane.

In this manner, the first device entity is an access network element, and the second device entity is a control plane entity in a core network; or, the first device entity is a user plane entity in the core network, and the second device entity is a control plane entity in the core network.

For example, the first device entity is a gNB, and the second device entity is a SMF (Session Management Function) entity; or, the first device is a UPF and the second device entity is an SMF.

In an implementation of the present application, when a connection of an Ethernet type is established or modified, the first device entity acquires the header information of the Ethernet data packet from the second device entity. Specifically, when the PDU session of the Ethernet type is established or modified, the first device entity acquires the header information of Ethernet data packets corresponding to each PDU session of the Ethernet type, or the header information of the Ethernet data packets corresponding to each QoS flow of the Ethernet type, or the header information of the Ethernet data packets corresponding to each service flow of the Ethernet type from the second device entity.

For example, when the PDU session of the Ethernet type is established, the device entity B informs the device entity A of the header information of the Ethernet data packets corresponding to each PDU session, or the header information of the Ethernet data packets corresponding to each QoS flow, or the header information of the Ethernet data packets of each Ethernet service flow.

Further, the first device entity acquires the header information of the Ethernet data packet from the second device entity through a first interface, wherein the first interface is an interface between the first device entity and the second device entity; or, the first device entity acquires, from a third device entity, the header information of the Ethernet data packet from the second device entity through a second interface, wherein the second interface is an interface between the first device entity and the third device entity.

For example, the device entity B may inform the device entity A of the header information of the Ethernet data packet through an interface message between the device entity A and the device entity B when the connection of the PDU session is established/modified, or indirectly inform the device entity A of the header information of the Ethernet data packet through the interface message between any other device entity C and the device entity A. Here, when the connection of the PDU session is established or modified, the device entity A may request the header information of the Ethernet data packets of a certain PDU session or a certain QoS Flow or a certain service flow.

Optionally, the header information of the Ethernet data packet is transmitted through a specific first user plane tunnel, wherein the first user plane tunnel is a user plane tunnel between the first device entity and the third device entity. In an implementation, the specific first user plane tunnel is a GTP-U tunnel, and the GTP-U tunnel is identified by a GTP-U address.

For example, the device entity B may inform the device entity A of the header information of the Ethernet data packet through a specific user plane tunnel, such as a specific GTP-U tunnel, between the device entity A and the device entity C. In a specific implementation, a specific tunnel may be configured for specific header information (for example, the header information carrying 802.1Q information field), which may be a sub-tunnel of a tunnel for the PDU session, and the specific tunnel may be identified by a GTP-U address.

Manner Two: the first device entity acquires the header information of the Ethernet data packet from the second device entity through the control plane.

In this way, the first device entity is a user plane entity in a core network, and the second device entity is an access network element; or, the first device entity is an access network element, and the second device entity is a user plane entity in the core network.

For example, the first device entity is a UPF and the second device entity is a gNB; or, the first device entity is a gNB and the second device entity is a UPF.

In an implementation of the present application, the second device entity carries the first indication information in the header information of the Ethernet data packet to be sent. For example, when data arrives, the device entity B carries the indication information of the header information in the Ethernet data packet to be sent. Here, if the device entity B is a UPF, then the Ethernet data packet is a downlink packet, and if the device entity B is an access network element (such as a base station), the Ethernet data packet is an uplink packet.

Further, 1) the first indication information is carried in the header information of each Ethernet data packet sent by the second device entity. Or, 2) the first indication information is carried in the header information of the Ethernet data packet corresponding to the PDU session of a specific Ethernet type sent by the second device entity, or the header information of the Ethernet data packet corresponding to the QoS flow of a specific Ethernet type, or the header information of the Ethernet data packet corresponding to the service flow of a specific Ethernet type.

For the above 1), the device entity B carries the indication information of the header information in each Ethernet data packet. Or, for the above 2), the device entity B carries the indication information of the header information in the Ethernet data packet of a specific Ethernet connection, such as a specific Ethernet PDU Session or a specific Ethernet QoS flow or a specific Ethernet service flow.

For the user plane mode, the first indication information is represented by a reserved bit in the header information of the Ethernet data packet; or, the first indication information is represented by a specific bit in padding bits in the header information of the Ethernet data packet; or, the first indication information is represented by a reserved value of the PDU type in header information of the Ethernet data packet.

For example, referring to FIG. 2, which schematically shows the data packet format of a downlink PDU session, the data packet format of an uplink PDU session is similar to that of the downlink PDU session, and the indication information of the header information may be indicated by the reserved bit. For example, when byte 1, bit 3 of the reserved bit is set to 1, a specific header information indication is identified, such as an Ethernet header containing 802.1Q. Or, the indication information of the header information is expressed by a specific bit in padding bits, specifically, a reserved bit is used for indicating a new PDU session format, that is, a third or a subsequent byte contains the indication information of the header information; or, the indication information of the header information uses the reserved value of the PDU Type to indicate the indication information of the header information or indicate a new PDU session format, that is, indicate that the third or the subsequent byte contains the indication information of the header information.

TABLE 2

| | | Bits | | | | | | Number of |
|---|---|---|---|---|---|---|---|---|
| 7 | 6 | 5 | 4 | 3 | 2 | 1 | 0 | Octets |
| | PDU Type (=0) | | | | Spare | | | 1 |
| Spare | RQI | | | QoS Flow Identifier | | | | 1 |
| | | | Padding | | | | | 0-3 |

In an implementation of the present application, how the second device entity acquires the header information of the Ethernet data packet may be implemented in the following ways:

1. When the second device entity is a control plane entity in the core network, the second device entity acquires the header information of the Ethernet data packet from a fourth device entity. Further, the fourth device entity is a PCF (Policy Control Function) entity, a UDM (Unified Data Management) entity, an AF (Application Function) entity, or a terminal.

For example, when the device entity B is a control plane entity in the core network, such as a SMF, the device entity B may acquire the header information from other device entities, such as a PCF, UDM, AF or terminal.

Specially, when the fourth device entity is a terminal, the second device entity acquires the header information of the Ethernet data packet from the terminal when a connection of the Ethernet type is established or modified. Further, when the PDU session of the Ethernet type is established or modified, the terminal sends the header information of the Ethernet data packet corresponding to a specific PDU session of the Ethernet type, or the header information of the Ethernet data packet corresponding to a specific QoS flow of the Ethernet type, or the header information of the Ethernet data packet in a specific service flow of the Ethernet type, to the second device entity.

For example, when the device entity B (such as the SMF) acquires the header information from the terminal, the terminal indicates the header information of Ethernet data packet to the device entity B when an Ethernet-related connection is established or modified, for example, when the PDU Session connection is established. Further, the indicated header information of the Ethernet data packet may be for specific PDU session, specific QoS flow or specific service flow.

2. When the second device entity is a user plane entity in the core network, the second device entity acquires the header information of the Ethernet data packet from a specific tunnel of an external network.

For example, when the device entity B is a user plane entity in the core network, the device entity B may acquire the header information through a specific tunnel with an external network, such as a tunnel with an external Data Network Name (DNN) for the specific header information. When the device entity B receives data from the tunnel, it can be considered that the data is the specific header information.

FIG. 4 is a schematic diagram of composition structure of an apparatus for transmitting information provided by an implementation of the present application, which is applied to a first device entity. As shown in FIG. 4, the apparatus includes an acquisition unit.

The acquisition unit 401 is configured to acquire header information of an Ethernet data packet from a second device entity, wherein the header information of the Ethernet data packet includes first indication information, and the first indication information is used for indicating whether the header information of the Ethernet data packet contains a target information field.

In an implementation, the first indication information is used for indicating whether the header information of the Ethernet data packet contains 802.1Q label information and/or VLAN identification information.

In an implementation, the acquisition unit 401 is configured to acquire the header information of the Ethernet data packet from the second device entity through a control plane.

In an implementation, the first device entity is an access network element, and the second device entity is a control plane entity in a core network, or, the first device entity is a user plane entity in the core network, and the second device entity is a control plane entity in the core network.

In an implementation, when a connection of an Ethernet type is established or modified, the acquisition unit 401 acquires the header information of the Ethernet data packet from the second device entity.

In an implementation, when a PDU session of the Ethernet type is established or modified, the acquisition unit 401 acquires the header information of Ethernet data packets corresponding to each PDU session of the Ethernet type, or the header information of Ethernet data packets corresponding to each QoS flow of the Ethernet type, or the header information of the Ethernet data packets corresponding to each service flow of the Ethernet type, from the second device entity.

In an implementation, the acquisition unit 401 acquires the header information of the Ethernet data packet from the second device entity through a first interface, wherein the first interface is an interface between the first device entity and the second device entity; or, the acquisition unit 401 acquires, from a third device entity, the header information of the Ethernet data packet from the second device entity through a second interface, wherein the second interface is an interface between the first device entity and the third device entity.

In an implementation, when the acquisition unit 401 acquires, from the third device entity, the header information of the Ethernet data packet from the second device entity through the second interface, the header information of the Ethernet data packet is transmitted through a specific first user plane tunnel, wherein the first user plane tunnel is a user plane tunnel between the first device entity and the third device entity.

In an implementation, the specific first user plane tunnel is a GTP-U tunnel, and the GTP-U tunnel is identified by a GTP-U address.

In an implementation, the acquisition unit 401 is configured to acquire the header information of the Ethernet data packet from the second device entity through a user plane.

In an implementation, the first device entity is a user plane entity in a core network, and the second device entity is an access network element; or, the first device entity is an access network element, and the second device entity is a user plane entity in the core network.

In an implementation, the acquisition unit 401 is further configured to acquire the indication information of the header information of the Ethernet data packet from the data packet sent by the second device entity.

In an implementation, the first indication information is carried in the header information of each Ethernet data packet sent by the second device entity.

In an implementation, the first indication information is carried in the header information of the Ethernet data packet corresponding to the PDU session of a specific Ethernet type sent by the second device entity, or in the header information of the Ethernet data packet corresponding to the QoS flow of the specific Ethernet type, or in the header information of the Ethernet data packet corresponding to the service flow of the specific Ethernet type.

In an implementation, the first indication information is represented by a reserved bit in the header information of the Ethernet data packet; or, the first indication information is represented by a specific bit in padding bits in the header information of the Ethernet data packet; or, the first indication information is represented by a reserved value of the PDU type in the header information of the Ethernet data packet.

In an implementation, when the second device entity is a control plane entity in the core network, the second device entity acquires the header information of the Ethernet data packet from a fourth device entity.

In an implementation, the fourth device entity is a PCF entity, a UDM entity, an AF entity, or a terminal.

In an implementation, when the fourth device entity is the terminal, when the connection of the Ethernet type is established or modified, the second device entity acquires the header information of the Ethernet data packet from the terminal.

In an implementation, when the PDU session of the Ethernet type is established or modified, the terminal sends the header information of the Ethernet data packet corresponding to a specific PDU session of the Ethernet type, or the header information of the Ethernet data packet corresponding to a specific QoS flow of the Ethernet type, or the header information of the Ethernet data packet of a specific service flow of the Ethernet type, to the second device entity.

In an implementation, when the second device entity is the user plane entity in the core network: the second device entity acquires the header information of the Ethernet data packet from a specific tunnel of an external network.

Those skilled in the art should understand that the relevant description of the apparatus for transmitting information of the implementation of the present application may be understood with reference to the relevant description of the method for transmitting information of the implementation of the present application.

Referring to FIG. 5, FIG. 5 is a schematic diagram of structure of a communication device 600 according to an implementation of the present application. The communication device may be an access network element or a user plane element in a core network, such as UPF. The communication device 600 shown in FIG. 5 includes a processor 610, and the processor 610 may call and run a computer program from a memory to implement the method in the implementation of the present application.

Optionally, as shown in FIG. 5, the communication device 600 may further include a memory 620. The processor 610 may call and run a computer program from the memory 620 to implement the method in the implementation of the present application.

The memory 620 may be a separate device independent of the processor 610 or may be integrated in the processor 610.

Optionally, as shown in FIG. 5, the communication device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and the number of antennas may be one or more.

Optionally, the communication device 600 may be a network device of the implementation of the present application, and the communication device 600 may implement the corresponding processes implemented by the network device in various methods of the implementations of the present application, which will not be repeated here for brevity.

Optionally, the communication device 600 may be specifically a mobile terminal/terminal of the implementation of the present application, and the communication device 600 may implement the corresponding processes implemented by the mobile terminal/terminal in the various methods of the implementations of the present application, which will not be repeated here for brevity.

Figure 6:
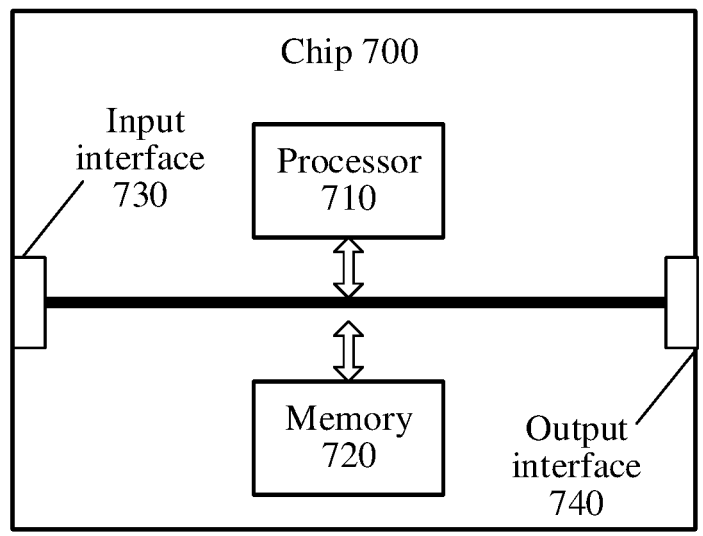
FIG. 6 is a schematic diagram of a structure of a chip of an implementation of the present application.

FIG. 6 is a schematic diagram of a structure of a chip of an implementation of the present application. A chip 700 shown in FIG. 6 includes a processor 710. The processor 710 may call and run a computer program from a memory to implement the method in the implementation of the present application.

Optionally, as shown in FIG. 6, the chip 700 may further include a memory 720. The processor 710 may call and run a computer program from the memory 720 to implement the method in the implementation of the present application.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementation of the present application, and the chip may implement the corresponding processes implemented by the network device in various methods of the implementations of the present application, which will not be repeated here for brevity.

Optionally, the chip may be applied in a mobile terminal/terminal of the implementation of the present application, and the chip may implement the corresponding processes implemented by the mobile terminal/terminal in the various methods of the implementations of the present application, which will not be repeated here for brevity.

It should be understood that the chip mentioned in the implementation of the present application may be referred to as a system-level chip, a system chip, a chip system or a system-on-chip, etc.

Figure 7:
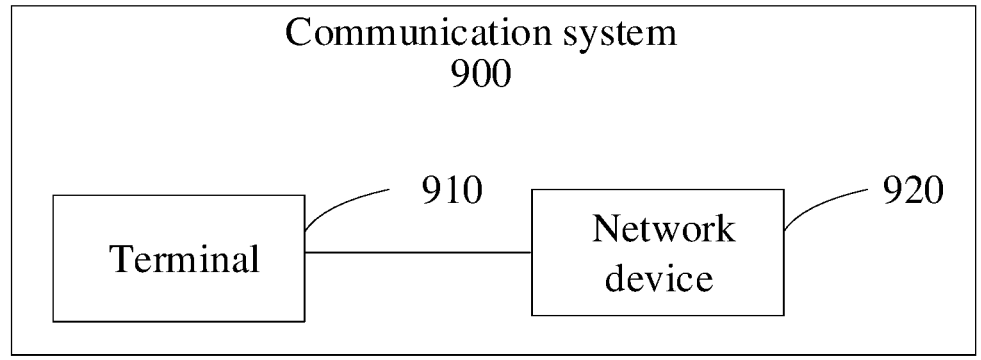
FIG. 7 is a schematic block diagram of a communication system provided by an implementation of the present application.

FIG. 7 is a schematic block diagram of a communication system 900 provided by an implementation of the present application. As shown in FIG. 7, the communication system 900 may include a terminal 910 and a network device 920.

Herein, the terminal 910 may be configured to implement the corresponding functions implemented by the terminal in the above-mentioned methods, and the network device 920 may be configured to implement the corresponding functions implemented by the network device in the above-mentioned methods, which will not be repeated here for brevity.

It should be understood that, the processor in this implementation of the present application may be an integrated circuit chip having a signal processing capability. In an implementation process, the steps of the foregoing method implementations may be implemented by using an integrated logic circuit of hardware in the processor or instructions in a form of software. The processor above may be a general purpose processor, a Digital Signal Processing (DSP), an Application Specific Integrated Circuit (ASIC), a Field Programmable Gate Array (FPGA) or another programmable logic device, a discrete gate or a transistor logic device, or a discrete hardware component. The processor may implement or perform various methods, steps and logical block diagrams disclosed in the implementations of the present application. The general purpose processor may be a microprocessor, or the processor may be any conventional processor or the like. The steps of the method disclosed with reference to the implementations of the present application may be directly implemented by a hardware decoding processor, or may be implemented by a combination of the hardware in the decoding processor and software modules. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in this implementation of the present application may be a volatile memory or a non-volatile memory, or may include both a volatile memory and a non-volatile memory. The non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any other proper type of memory.

It should be understood that, the foregoing memory is an example for illustration and should not be construed as limiting. For example, optionally, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present application are intended to include, but are not limited to, these and any other suitable type of memory.

An implementation of the present application further provides a computer readable storage medium configured to store a computer program.

Optionally, the computer readable storage medium may be applied in a network device of the implementation of the present application, and the computer program enables the computer to perform the corresponding processes implemented by the network device in various methods of the implementations of the present application, which will not be repeated here for brevity.

Optionally, the computer readable storage medium may be applied in a mobile terminal/terminal of the implementation of the present application, and the computer program enables the computer to perform the corresponding processes implemented by the mobile terminal/terminal in various methods of the implementations of the present application, which will not be repeated here for brevity.

An implementation of the present application also provides a computer program product including computer program instructions.

Optionally, the computer program product may be applied in a network device of the implementation of the present application, and the computer program instructions enable the computer to perform the corresponding processes implemented by the network device in various methods of the implementations of the present application.

Optionally, the computer program product may be applied in a mobile terminal/terminal of the implementation of the present application, and the computer program instructions enable the computer to perform the corresponding processes implemented by the mobile terminal/terminal in various methods according to the implementations of the present application.

An implementation of the present application also provides a computer program.

Optionally, the computer program may be applied in a network device of the implementation of the present application. When the computer program is run on the computer, the computer is enabled to perform the corresponding processes implemented by the network device in various methods of the implementations of the present application.

Optionally, the computer program may be applied in a mobile terminal/terminal of the implementation of the present application. When the computer program is run on the computer, the computer is enabled to perform the corresponding processes implemented by the mobile terminal/terminal in various methods of the implementations of the present application.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the foregoing method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if achieved in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, a network device or the like) to perform all or part of the acts of the method described in various implementations of the present application. The foregoing storage medium includes: any medium that can store program code, such as a USB flash drive, a removable hard disk, a Read-Only Memory (ROM), a Random Access Memory (RAM), a magnetic disk, or an optical disc.

What are described above are merely exemplary implementations of the present application, but the protection scope of the present application is not limited thereto. Any variation or substitution that may be easily conceived by a person familiar with the art within the technical scope disclosed by the present application shall be included within the protection scope of the present application. Therefore, the protection scope of the present application shall be determined by the protection scope of the claims.

What is claimed is:

1. A method for transmitting information, comprising:
acquiring, by a first device entity, header information of an Ethernet data packet from a second device entity, wherein the header information of the Ethernet data packet comprises first indication information, and the first indication information is used for indicating whether the header information of the Ethernet data packet contains a target information field; wherein acquiring, by the first device entity, the header information of the Ethernet data packet from the second device entity comprises:
acquiring, by the first device entity, the header information of the Ethernet data packet from the second device entity through a control plane; wherein
acquiring, by the first device entity, the header information of the Ethernet data packet from the second device entity through a first interface, wherein the first interface is an interface between the first device entity and the second device entity; or,
acquiring, by the first device entity, from a third device entity, the header information of the Ethernet data packet from the second device entity through a second interface, wherein the second interface is an interface between the first device entity and the third device entity;
wherein when the first device entity acquires from the third device entity the header information of the Ethernet data packet from the second device entity through the second interface,
the header information of the Ethernet data packet is transmitted through a specific first user plane tunnel, wherein the first user plane tunnel is a user plane tunnel between the first device entity and the third device entity;

wherein the specific first user plane tunnel is a GTP-U tunnel, and the GTP-U tunnel is identified by a GTP-U address.

2. The method of claim 1, wherein the first indication information is used for indicating whether the header information of the Ethernet data packet contains 802.1Q label information and/or Virtual Local Area Network (VLAN) identification information.

3. The method of claim 1, wherein
the first device entity is an access network element, and the second device entity is a control plane entity in a core network; or,
the first device entity is a user plane entity in the core network, and the second device entity is a control plane entity in the core network.

4. The method of claim 3, wherein when the second device entity is the control plane entity in the core network, the second device entity acquires the header information of the Ethernet data packet from a fourth device entity; wherein the fourth device entity is a policy control function (PCF) entity, a unified data management (UDM) entity, an application function (AF) entity, or a terminal.

5. The method of claim 4, wherein when the fourth device entity is a terminal, when a connection of an Ethernet type is established or modified, the second device entity acquires the header information of the Ethernet data packet from the terminal.

6. The method of claim 5, wherein when a PDU session of the Ethernet type is established or modified, the terminal sends the header information of the Ethernet data packet corresponding to a specific PDU session of the Ethernet type, or the header information of the Ethernet data packet corresponding to a specific QoS flow of the Ethernet type, or the header information of the Ethernet data packet of a specific service flow of the Ethernet type, to the second device entity.

7. The method of claim 1, wherein when a connection of an Ethernet type is established or modified, acquiring, by the first device entity, the header information of the Ethernet data packet from the second device entity; wherein, when a PDU session of the Ethernet type is established or modified, acquiring, by the first device entity, the header information of Ethernet data packets corresponding to each PDU session of the Ethernet type, or the header information of Ethernet data packets corresponding to each QoS flow of the Ethernet type, or the header information of Ethernet data packets corresponding to each service flow of the Ethernet type, from the second device entity.

8. A communication device, comprising a processor and a memory, wherein the memory is configured to store a computer program and the processor is configured to call and execute the computer program stored in the memory to perform the method according to claim 1.

9. A chip, comprising: a processor configured to call and run a computer program from a memory, and cause a device provided with the chip to execute the method according to claim 1.

10. A computer readable storage medium storing a computer program, wherein the computer program enables a computer to perform the method according to claim 1.

11. An apparatus for transmitting information applied to a first device entity, comprising a memory and a processor, wherein the processor is configured to execute instructions stored in the memory to perform following operations:
acquiring header information of an Ethernet data packet from a second device entity, wherein the header information of the Ethernet data packet comprises first indication information, and the first indication information is used for indicating whether the header information of the Ethernet data packet contains a target information field; wherein the processor is further configured to execute instructions stored in the memory to perform following operations:
acquiring the header information of the Ethernet data packet from the second device entity through a control plane; wherein the processor is further configured to execute instructions stored in the memory to perform following operations:
acquiring the header information of the Ethernet data packet from the second device entity through a first interface, wherein the first interface is an interface between the first device entity and the second device entity; or,
acquiring the header information of the Ethernet data packet from the second device entity through a second interface, wherein the second interface is an interface between the first device entity and the third device entity;
wherein when the processor is configured to execute instructions stored in the memory to acquire from the third device entity the header information of the Ethernet data packet from the second device entity through the second interface,
the header information of the Ethernet data packet is transmitted through a specific first user plane tunnel, wherein the first user plane tunnel is a user plane tunnel between the first device entity and the third device entity;
wherein the specific first user plane tunnel is a GTP-U tunnel, and the GTP-U tunnel is identified by a GTP-U address.

* * * * *